United States Patent [19]

Teeri

[11] Patent Number: 5,634,994
[45] Date of Patent: Jun. 3, 1997

[54] ANTI-SKID STUD

[76] Inventor: Niilo H. Teeri, Niemenmäentie 4 B 19, SF-00350 Helsinki, Finland

[21] Appl. No.: 461,099

[22] Filed: Jun. 5, 1995

Related U.S. Application Data

[63] Continuation of Ser. No. 75,467, filed as PCT/FI91/00383, Dec. 12, 1991, published as WO92/10374, Jun. 25, 1992, abandoned.

[30] Foreign Application Priority Data

Dec. 14, 1990 [FI] Finland .................... 906197

[51] Int. Cl.$^6$ .................... B60C 11/16
[52] U.S. Cl. .................... 152/210
[58] Field of Search .................... 152/210, 211

[56] References Cited

U.S. PATENT DOCUMENTS

| 897,319 | 9/1908 | Stimpson | 152/210 |
|---|---|---|---|
| 959,177 | 5/1910 | Stimpson | 152/210 |
| 962,794 | 6/1910 | Stimpson | 152/210 |
| 2,301,569 | 11/1942 | Müklich | 152/210 |
| 3,179,146 | 4/1965 | Edsmar | 152/210 |
| 3,179,147 | 4/1965 | Edsmar | 152/210 |
| 3,186,466 | 6/1965 | Keinänen | 152/210 |
| 3,428,105 | 2/1969 | Grötsch | 152/210 |
| 3,578,053 | 5/1971 | Milliken | 152/210 |

FOREIGN PATENT DOCUMENTS

| 49264 | 7/1968 | Finland . |
|---|---|---|
| 82907 | 7/1989 | Finland . |
| 1228158 | 11/1966 | Germany . |
| 96005 | 6/1984 | Japan . |
| 60-29307 | 2/1985 | Japan . |

Primary Examiner—Michael W. Ball
Assistant Examiner—Francis J. Lorin
Attorney, Agent, or Firm—Tilton, Fallon, Lungmus & Chestnut

[57] ABSTRACT

The invention relates to an anti-skid stud the operation of which is based on a larger than conventional diameter of the tip part (1) of the anti-skid stud and on its primarily annular contact with the road surface during normal driving, with a slight projection of the tip and with a small surface pressure, the projection increasing in situations in which it is needed, for example during braking, the external force P caused by the braking tilting the anti-skid stud in its position, whereupon the projected edge 5 of the tip part will penetrate over its entire width into the road surface. The stud includes a mantle surface which is made of a material harder than a central portion of the tip.

1 Claim, 1 Drawing Sheet

ANTI-SKID STUD

This application is a continuation of application Ser. No. 075,467, filed as PCT/FI91/00383, Dec. 12, 1991, published as WO92/10374, Jun. 25, 1992, now abandoned.

BACKGROUND AND SUMMARY OF INVENTION

Anti-skid studs for vehicle tires are largely based on the principle of a spike projecting out from the tire and being made up of a thin hard-metal stud, 2–3 mm in diameter, which is surrounded in a varying manner by metal or plastic or by a combination of the two. All of them have the disadvantage that the small hard-metal tip subjects the road to a relatively high surface pressure, which wears an ice-free road, and that, on the other hand, its grip is very poor on a thin so-called black ice surface, which the tip of the stud cannot penetrate. As a result, a stud, rounded by wear, will skate on the ice surface, with a friction coefficient even lower than that of rubber.

An anti-skid stud according to the present invention reduces the disadvantages referred to above, and it is based on a solution the characteristics of which are given in the patent description and the patent claims.

BRIEF DESCRIPTION OF DRAWING

The invention is described below in greater detail with reference to the drawings, in which.

DETAILED DESCRIPTION

Figure 1:
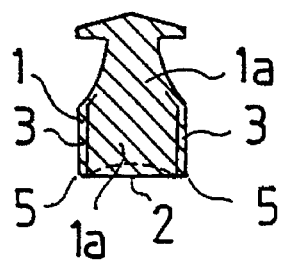
FIGS. 1 and 5 depict each a vertical section of a side elevation of an anti-skid stud according to the invention.
Figure 2:
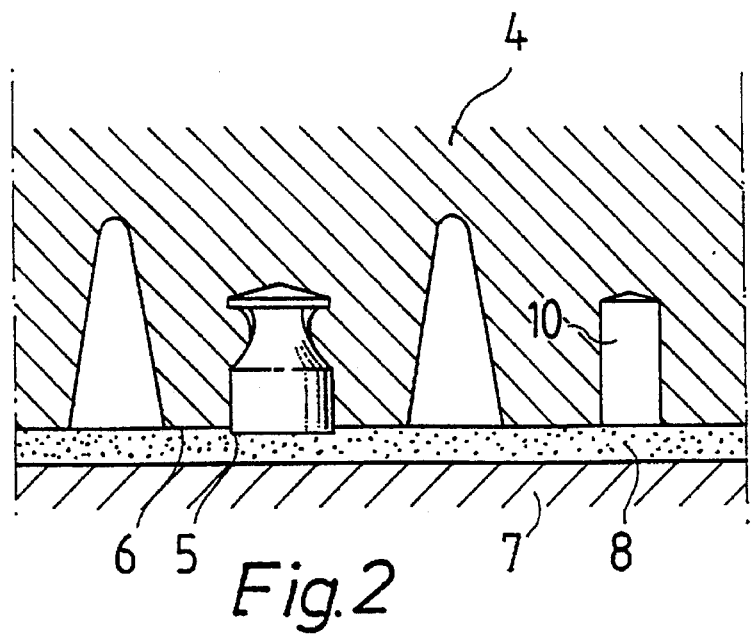
FIG. 2 depicts the anti-skid stud installed in a vehicle tire, the tire part being at rest or rolling against an icy road surface.

An anti-skid stud according to the invention is characterized in that the flanged anti-skid stud (FIGS. 1 and 5), installed in a vehicle tire in a conventional manner, has no conventional hard-metal pin; the anti-skid tip 1 of the stud has in the gripping area 5 a diameter (in general 5... 12 mm) which is large in comparison with the total length of the anti-skid stud. In FIG. 1 the tip of the stud constitutes a concave or straight surface 2, in which case its road contact is primarily annular and wide when the stud is in its basic position perpendicular to the road surface (FIG. 2). Owing to the width of the contact area, the surface pressure against the road is relatively low. The core part, i.e. the body material 1a, of the anti-skid stud is not so hard as its mantle surface 3, and this prevents the tip 2 of the stud from obtaining a convex shape as the stud wears down.

Figure 3:
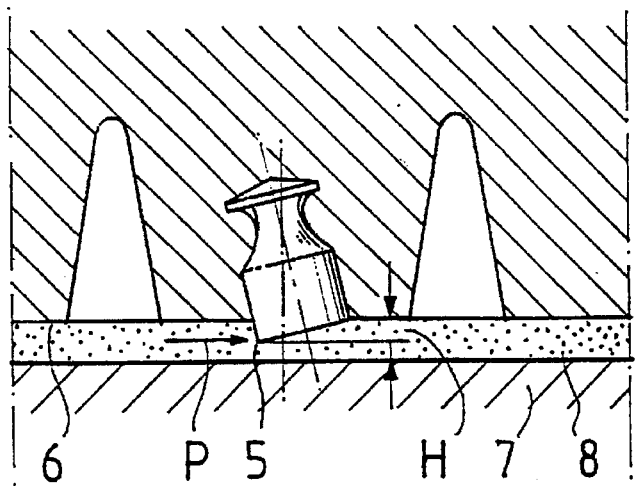
FIG. 3 depicts the anti-skid stud in a vehicle tire against the road surface when braking force or some other horizontal force is acting between the road and the tire.
Figure 4:
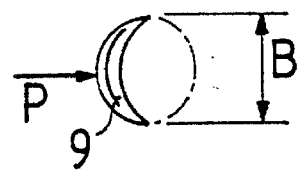
FIG. 4 depicts the wide and deep contact area produced by the anti-skid stud in an icy road surface at the time of braking or acceleration, or when the vehicle tends, for example, to side-slip.

Anti-skid studs according to the invention are placed in a vehicle tire in a conventional manner, installed in bed-holes 10 prepared in advance in the tire tread rubber 4 (FIG. 2), i.e. around the whole tire, in a suitable number, usually the maximum number permitted in the regulations. Unloaded, the annular tip 5 of the anti-skid stud protrudes somewhat from the surface 6 of the vehicle tire. In FIG. 2 the tire is pressed by the weight of the vehicle against the ice surface 8 on the road surface 7, whereupon the annular tip 5 of the anti-skid stud will penetrate somewhat into the ice surface 8. When the vehicle is traveling, without acceleration or braking, on a road covered with glaze ice, the anti-skid stud is in its stand-by position in accordance with FIG. 2. When there is braking, acceleration or, for example, a danger of sideslipping, the stud tilts under the action of an external force P (FIG. 3). Owing to the tilting of the stud, its annular tip 5 tends outward from the tire tread 6, against the direction of movement, whereupon the tip 5 of the stud will form a wide, claw-like obstacle which will penetrate into the ice, i.e. producing a chisel-like grip which effectively reduces the danger of sideslipping and skidding. FIG. 4 depicts the shape of the impression 9 caused by the stud tip 5, the shape being oriented against the tendency to skid and having width B and depth H (FIG. 3).

The anti-skid stud, made of one material, according to FIG. 1 is made of a material which can be processed so as to be hard on its surface, for example of cemented steel with a cementation depth of approx. 1 mm and a surface hardness of over 800 HV within the area 3, the core part 1a which will wear into a concave shape remaining softer. The tip part 2 which will wear so as to obtain a concave shape can be left uncemented, in which case it will initially operate as a straight plane and will gradually wear into a concave shape, or it can be machined into a concave shape after the cementation. Although an anti-skid stud thus made is somewhat heavier than conventional studs, owing to its greater exterior diameter, its road-wearing action is considerably less than that of conventional studs, owing to the considerably lower surface pressure against the road surface during normal rolling. However, in a skid situation the grip against the road is good. The material of the anti-skid stud may also be some other material which can be processed to be hard on its exterior surface but is lighter than cemented steel.

Figure 5:
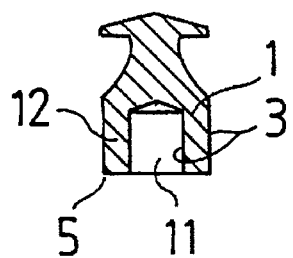

In an anti-skid stud according to FIG. 5, made of a suitably hard material or of a material which can be processed so as to be hard, the concavity 2 in FIG. 1 has been replaced by a void 11, which will maintain the straightness of the tip 5 and its annular contact with the road surface during rolling. For example, rapid steel, cemented steel, and various ceramic materials are suitable materials. Made in this manner, for example the weight of an anti-skid stud made of cemented steel may be reduced and the hardest possible cementation is obtained for almost all of the material 12 coming into contact with the road, as cementation also takes place inside the void 11. The void 11 may, when necessary, be filled up with some lightweight material softer than the material 12.

The invention is not restricted to the embodiments and raw materials described above but may in its details vary greatly within the scope of the patent claim.

I claim:

1. A vehicle tire and anti-skid stud combination comprising:
   a vehicle tire having a tread which defines a plurality of bed-holes;
   a plurality of anti-skid studs disposed in said bed-holes, each of said anti-skid studs having a tip part including a flat or concave tip having a diameter of approximately 5 mm to 12 mm, each of said studs being positioned in said tread such that, when said stud is in a stand-by position, said tip projects slightly from a surface of said tread and said stud is aligned substantially perpendicular to said surface of said tread;
   each of said tips of said studs including an edge such that, when an external force acts laterally upon said stud, said stud tilts so that an edge projects from said surface of said tread to a greater extent than when said stud is in said stand-by position so that said tip provides a wide grip, which is deeper than when said stud is in said stand-by position, against a slippery road surface; said tip of each of said studs including an outer mantle surface composed of a material that is harder than a central part of said tip to prevent said tip from forming a convex shape and tending to promote the tip to wear in a concave shape or to remain almost flat.

* * * * *